United States Patent [19]
Hammon

[11] Patent Number: 5,766,643
[45] Date of Patent: Jun. 16, 1998

[54] COTTON CANDY MACHINE AND SPINNER HEAD

[75] Inventor: Roger Hammon, Cincinnati, Ohio

[73] Assignee: Gold Medal Products Company, Cincinnati, Ohio

[21] Appl. No.: 645,657

[22] Filed: May 14, 1996

[51] Int. Cl.$^6$ ..................................................... A23G 3/00
[52] U.S. Cl. ........................... 425/9; 264/8; 99/348; 425/8
[58] Field of Search .................... 425/8, 9; 264/8; 426/483; 99/483, 348

[56] References Cited

U.S. PATENT DOCUMENTS

| | | |
|---|---|---|
| 3,118,397 | 1/1964 | Brown et al. ................................ 425/9 |
| 4,356,957 | 11/1982 | Eberle ......................................... 233/26 |
| 4,872,821 | 10/1989 | Weiss ........................................... 425/9 |

Primary Examiner—Jay H. Woo
Assistant Examiner—Iurie Schwartz
Attorney, Agent, or Firm—Wood, Herron & Evans LLP

[57] ABSTRACT

A spinner head for a cotton candy machine includes an electrically insulative upper head with at least one integral extending spacer sleeve having a bore therethrough. The spinner head also includes a cap, a sugar melting heater, and a perforated band surrounding the heater. A fastener extends through the sleeve securing the cap to the upper head. The upper head preferably includes a depending hub about the head's axis of rotation, having a bore therethrough, and a depending sleeve defining said bore therethrough offset from the axis. The spinner head preferably includes a lower head having a hub oriented about the axis of rotation, an integrally formed flange with a bore therethrough and a depending sleeve with a bore therethrough offset from the axis. A pair of slip rings alternately contact respective studs extending to electrical terminals of the heater to provide power to the heater, each stud being insulated from the other stud and its connective or operable slip ring by the insulative material of the heads and the noted respective sleeves thereof.

14 Claims, 2 Drawing Sheets

5,766,643

COTTON CANDY MACHINE AND SPINNER HEAD

FIELD OF THE INVENTION

The present invention relates generally to cotton candy machines, and more particularly, to an improvement in cotton candy spinner heads.

BACKGROUND OF THE INVENTION

Machines for spinning granular sugar into sugar filaments or so-called cotton candy are well known. A typical cotton candy machine has a base, which houses a motor which drives a rotatable shaft to which a spinner head is mounted. Bearings rotatably support the rotating shaft within the motor. Granular sugar is introduced into the spinner head. The spinner head is surrounded by a bowl or basket in which congealed or cooled fibers are collected as candy. A paper cone is manually introduced into the bowl between the spinner head and bowl and is twisted to collect a serving of the cotton candy.

A typical spinner head for a cotton candy machine includes a slotted or perforated band forming a ring and a defining chamber into which the sugar is poured. A ribbon-like, perforate heating element is disposed in ring-like form internally of, but adjacent the slotted band. When heated, the heating element melts the granular sugar forced against it by the centrifugal force caused by the spinning motion of the head. Molten sugar moves through openings in the heating element and issues from the slots in the band as molten fibers. These fibers cool and congeal on their way toward the surrounding bowl and may be captured by the bowl or collected as candy floss on a paper cone interjected therebetween. One such apparatus is described in U.S. Pat. No. 1,489,342, and another in each of U.S. Pat. Nos. 4,872,821 and 4,145,687, each of which is expressly incorporated herein by reference.

While proving useful, the typical spinner heads disclosed in the two most recent patents recited above and incorporated herein, particularly as shown in FIG. 2 of each patent, have numerous inherent disadvantages.

Such prior typical heads require numerous parts which increase the expense of the head and of its assembly. Separate insulators must be used to isolate the fasteners holding the head components together, and to isolate the studs used to conduct electricity from the slip rings of the head to the heater terminals. All these parts weigh the spinner head down, requiring increased horsepower to spin it. Moreover, the heads must be balanced carefully so vibrations do not unduly reduce useful life, and the noted shaft bearings must be selected to withstand the loads imposed by the weight of the spinner head and any non-damped or out-of-balance vibrations.

In view of the above disadvantages of prior cotton candy machine spinner heads, it is desirable to provide an improved cotton candy spinner head which does not require the multiplicity of parts of prior spinner heads, weighs less and is operable with a lower horsepower motor to drive the head, and results in longer bearing life. Moreover, it is desirable to provide a spinner head that is dielectrically insulated from the motor shaft while also having fewer insulating sleeves and washers and other parts, thus resulting in a spinner head assembly that costs less than prior spinner heads.

SUMMARY OF THE INVENTION

To these ends, a preferred embodiment of the present invention includes a cotton candy spinner head comprising a cap and upper and lower heads of electrically insulative materials and integral sleeve extensions for insulating cap screws and electrical studs. More specifically, the upper head is made of a dielectrically insulating material and has spacer sleeves that are formed integrally with the upper head for insulating the cap fasteners from the heater and the electrical leads and terminals. Similarly, the lower head is also formed from a dielectrically insulating material. The upper head and the lower head interconnect and are assembled with two electrically conductive slip rings and have integrally formed sleeves for insulating the conductive slip rings and respective electrically conducting studs passing therethrough.

One advantage of the present invention is that the cost of a cotton candy machine spinner head is substantially reduced due to the improved spinner head having less parts. A spinner head having fewer parts is also easier to maintain than prior spinner head designs. Furthermore, the spinner head of the present invention is lighter than prior spinner heads, thus requiring a lower horsepower motor to drive the spinner head and promoting longer bearing life. Also, in accordance with the present invention, a spinner head is provided that more effectively dielectrically insulates the fasteners from the electrical connections. Moreover, the improved spinner head is easier to balance, resulting in yet longer bearing and motor life. These and other objects and advantages of the present invention will be apparent from the accompanying drawings and the description of a preferred embodiment of the invention.

BRIEF DESCRIPTION OF THE DRAWINGS

Referring now to the drawings, FIG. 1 shows a cotton candy machine 10 of one type with which one preferred embodiment of the invention may be used. The machine 10 includes a motor supporting base 12, a collecting bowl or basket 14 mounted on the base 12. The bowl or basket 14 has a mesh candy collector or liner 16 therein, and a spinner head 18, according to the invention, is disposed on the center axis A of the bowl 14. The base 12 is provided with a series of controls and mounts motor (not shown) for rotating the spinner head 18 about the axis A. In use, sugar poured into an opening 20 in the spinner head 18. The spinner head 18 is rotated, while at the same time, heated to melt the sugar and fling it outwardly toward the mesh candy collector 16. A paper cone 22 or the like can be inserted between liner 16 and the spinner head 18 for collecting cotton candy thereon for consumption.

Turning now to FIGS. 2 and 3, the details of the spinner head 18, according to a preferred embodiment of the present invention are illustrated therein. The spinner head 18 includes a spinner cap 30 and an upper head 32. Disposed between the cap 20 and the upper head 32 is a perforated band 34 which circumferentially surrounds a heater 36 having electrical connections 33 and 35. The upper head 32 has a recess 37 adapted to receive perforated band 34.

Figure 1:
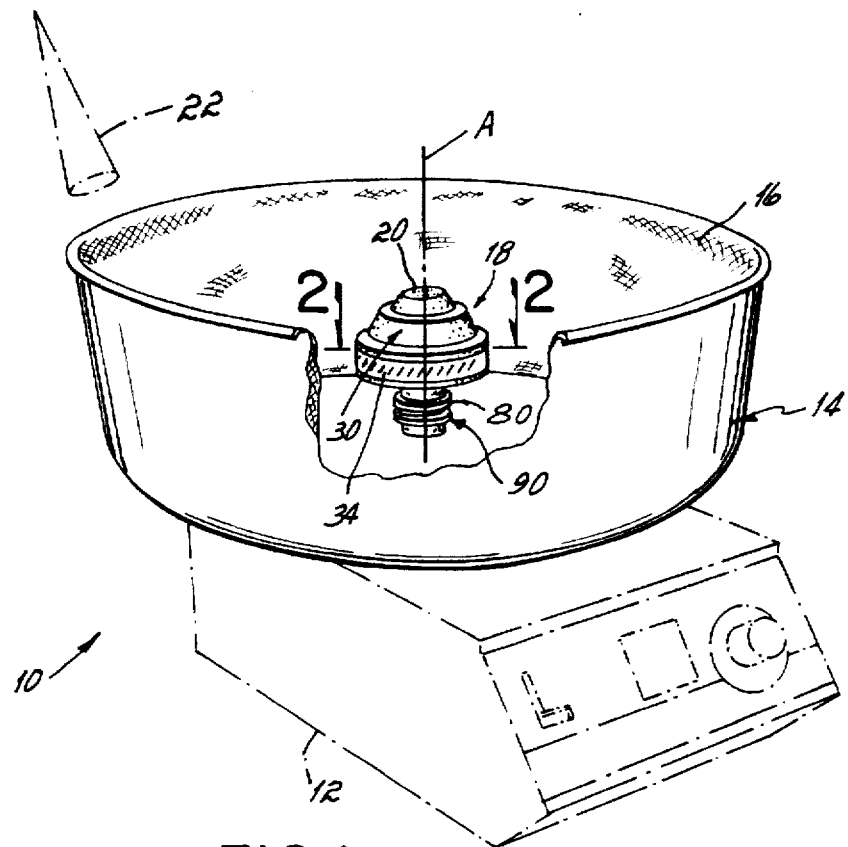
FIG. 1 is a perspective view of a cotton candy machine according to the invention.

It will be appreciated that the spinner head 18 of the present invention can utilize a variety of perforated bands and heating elements. The details of the perforated band 34 and the heater 36 are known generally to those skilled in the art and are not shown in the drawings nor described in great detail herein. Further details of a typical construction of the perforated band 34 and the heater 36 can be seen in U.S. Pat.

Nos. 4,872,871, 5,441,754 and 5,498,144, all of which are assigned to the assignee of the present invention. It will also be appreciated that the spinner head 18 of the present invention can be used with a cotton candy machine having a single perforated band and heater or for machines with multiple perforated bands and heaters. Spinner heads having multiple bands and heaters are disclosed in U.S. Pat. Nos. 5,441,754 and 5,498,144.

Figure 2:
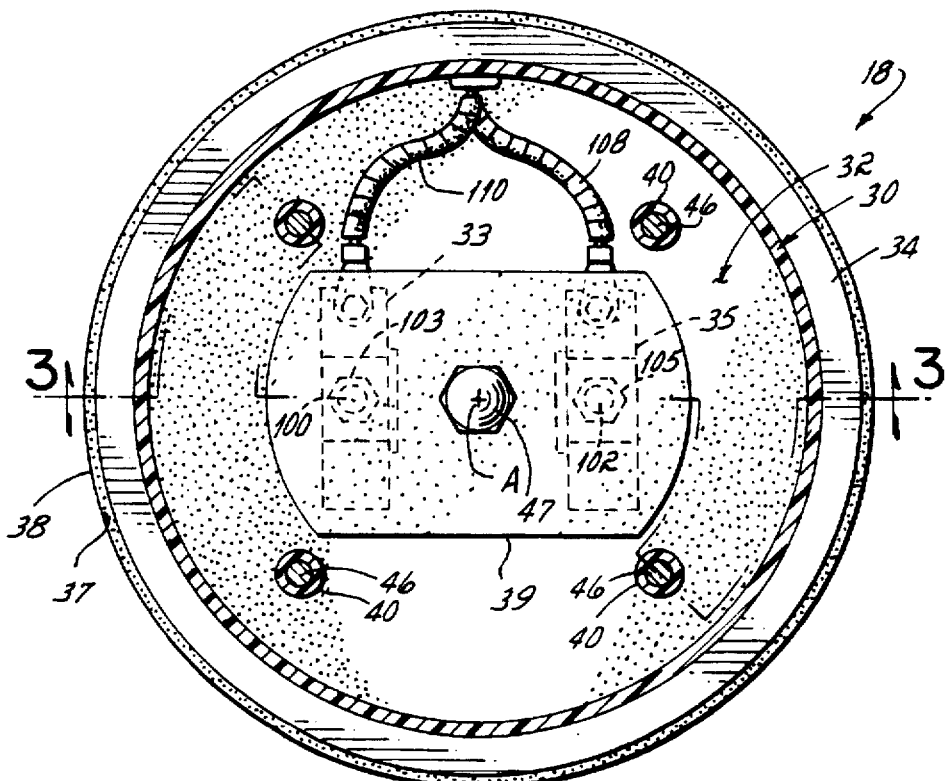
FIG. 2 is view taken along line 2—2 of FIG. 1.
Figure 3:
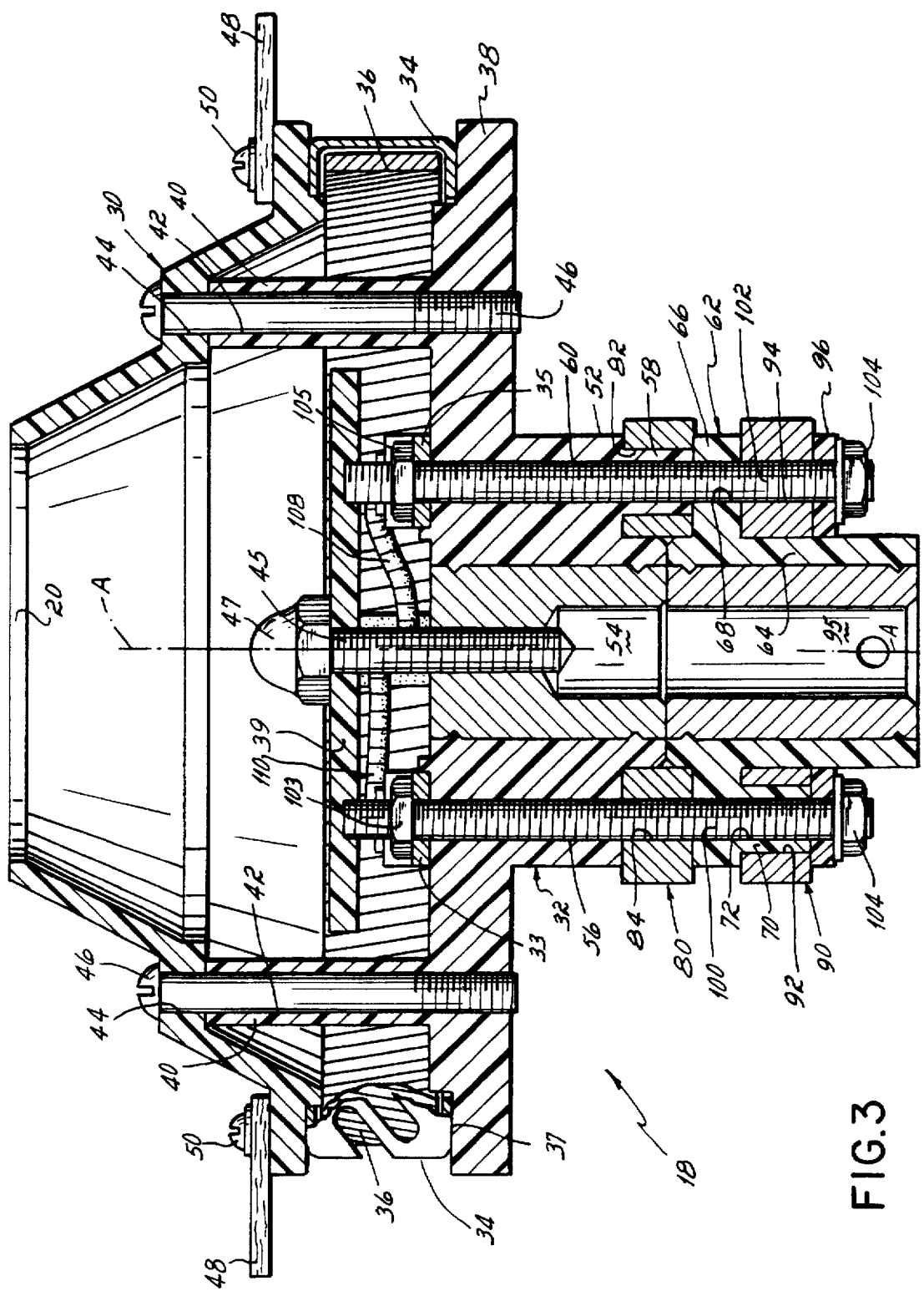
FIG. 3 is a view taken along line 3—3 of FIG. 2.

Still referring to FIGS. 2 and 3, the upper head 32 includes a disk 38 of non-conductive material such as a polymer and preferably a polycarbonate derivative having a density less than aluminum and at least one spacer sleeve 40 formed integrally with a disk 38. The spacer sleeve 40 has a bore 42 therethrough. Preferably, the disk 38 has a plurality of the spacer sleeves 40 formed integrally therewith, and the cap 30 has a plurality of bores 44 therein indexed to be aligned with the spacer sleeves 40. A plurality of fasteners 46, such as screws, pass through the bores 44 in the cap 40 and the bores 42 in the spacer sleeves 40 to secure the cap 30 and the upper head 32 together. The spacer sleeves 40 electrically insulate the fasteners 46.

A jack screw 45 is threaded into upper head 32 and engages an upper end of a motor shaft (not shown) to support the spinner head 18. An acorn nut 47 on jacket screw 45 secures an insulator plate 39 over electrical terminals 33 and 35. The top of the cap 30 has mounted thereon leather floaters 48, which are held to the cap 30 with screws 50.

The upper head 32 preferably further includes a depending hub 52 about the axis A, and is molded integrally with the disk 38.

The hub 52 includes a drive bore 54 extending therein. Drive bore 54 is shaped to accommodate a drive shaft (not shown) of a motor mounted on base 12 (FIG. 1) for rotating the spinner head 18 about axis A. The hub 52 also has a bore 56 therethrough, offset from axis A, and a depending sleeve 58 formed integrally with the hub 52 and being offset for the axis A. The sleeve 58 also has a bore 60 therethrough and continuing upwardly through hub 52.

The spinner head 18 preferably further includes a lower head 62 having a hub 64 about axis A and a flange 66 formed integrally with the hub 64. The flange 66 has a bore 68 therethrough, and the flange 66 also has a depending sleeve 70 formed integrally therewith. A bore 72 extends through the depending sleeve 70 and the flange 66. The hub 64 includes a drive bore 95 extending therein. Drive bore 95 is shaped to accommodate a drive shaft (not shown) of a motor mounted on base 12 (FIG. 1) for rotating the spinner head 18 about axis A.

It will be appreciated that the reference to "upper head" and "lower head" are used herein only for to indicate general orientation of parts relative to each other and are not to be construed to as limiting the structure of the spinner head 18, or its function in any way.

Preferably, the cap 30, upper head 32 and the lower head 62 are each made of an electrically insulating material having a density less than aluminum. A person of ordinary skill in the art will appreciate that an appropriate material, could be, for example, a polymeric material, such as a polycarbonate derivative.

Continuing with further details of the spinner head 18, the spinner head preferably further includes a first conductive slip ring 80, disposed between the upper head 32 and the lower head 62. The first slip ring 80 has a first bore 82 therethrough for receiving the sleeve 58 depending from the hub 52 of the upper head 32. A second, spaced bore 84 extends through the first slip ring.

A second slip ring 90 is disposed adjacent the lower head 62. The second slip ring 90 has a first bore 92 therethrough for receiving the sleeve 70 depending from the flange 66 of the lower head 62. The second slip ring 90 has a second bore 94 extending therethrough. The spinner head 18 also has a phenolic washer 96 adjacent said lower head 62.

The upper head 32, lower head 62, slip rings 80 and 90, and the phenolic washer 96 are held together by head studs or elongated conductors 100, 102, and nuts 104. Head stud 100 passes through the bore 72 in the sleeve 70 depending from the flange 66 of the lower head 62, through the bore 84 in the first slip ring 80 and through the upper head 32 to contact electrical terminal 33, which is secured to the upper head 32 by nut 103. It will be appreciated that conductor or stud 100 is insulated from the second slip ring 90 by sleeve 70, but it is in electrical contact with the first slip ring 80 and the electrical terminal 33, which is secured to the upper head by nut 103.

Head stud 102 passes through and contacts the bore 94 in the second slip ring 90, through the bore 60 in the sleeve 58 depending from the hub 52 of the upper head 32, and through the upper head to contact electrical terminal 35, where it is held by nut 105. It will be appreciated that the head stud 102 is insulated from the first slip ring 80 by sleeve 58, but it is in electrical contact with the second slip ring 90.

As noted above, in a somewhat analagous fashion, stud 100 extends through bore 72 in sleeve 70, insulating stud 100 from slip ring 90. Stud 100 extends through bore 84, contacting ring 80, and upwardly through hub 52 to terminal 33.

Electrical terminal 35 is connected to the heater 36 by lead wire 108, and electrical terminal 33 is connected to the heater 36 by lead wire 110. In use, it will be appreciated that the cotton candy machine 10 provides electrically conductive brushes (not shown) for sliding engagement with the respective slip rings 80, 90 to connect the respective electrical terminals 33 and 35 by respective studs 100, 102, to a source of power for energizing the heater 36 as the spinner head turns.

It will be appreciated that the use and operation of the spinner head 18 of the present invention is similar to the spinner head shown in U.S. Pat. Nos. 4,872,821, 5,441,754, and 5,498,144, incorporated herein by reference, with the exception, of course, that the spinner head 18 of the current invention is superior in that it significantly reduces the number of phenolic insulator sleeves, washers and parts required by the prior spinner heads described in those patents. Also, the spinner head of the present invention is lighter in weight than prior art spinner heads, because the upper head 32, the lower head 62, and the cap 30 of the present invention are formed from a polymeric material, such as a polycarbonate derivative, lighter than the aluminum of the prior heads and are electrically insulative as well. Accordingly, even if a heater lead were to break, it would not make any short with the upper head structure made of non-conductive material, nor the cap fasteners, protected by the integral head sleeves. Thus, the cap 30, the upper head 32, and the lower head 62 are dielectrically insulated from the motor shaft, without the multiplicity of parts and the weight required in prior spinner heads.

While the present invention has been illustrated by a description of various embodiments and while these embodiments have been described in considerable detail, it is not the intention of the applicant to restrict or in any way limit the scope of the appended claims to such detail. For example, the spinner head of the present invention can be adapted to be used with multiple perforated bands and heaters. Additional advantages and modifications will readily appear to those skilled in the art. The invention in its broader aspects is therefore not limited to the specific details, representative apparatus and method, and illustrative example shown and described. Departures may be made from such details without departing from the spirit or scope of applicant's invention and applicant intends to be bound only by the claims appended hereto.

What is claimed is:

1. A spinner head adapted to be mounted for rotation about an axis for melting and spinning granular sugar into filaments, said spinner head comprising:

an upper head including a disk having an upper surface with at least one spacer sleeve formed integrally with said disk extending upwardly from said upper surface and having a bore therethrough;

a cap secured to said upper head;

a sugar melting heater and a perforated band circumferentially surrounding said heater, said heater and perforated band disposed between said cap and said disk;

a fastener passing through said bore in said at least one spacer sleeve and securing said cap to said upper head, wherein said upper head further includes an integral depending hub from said disk about said axis and having a bore therethrough, a sleeve depending from said hub formed integrally therewith and being offset from said axis and a bore extending through said hub and sleeve, a lower head comprising a second hub disposed about said axis adjacent said upper head and a radially extending flange formed integrally with said second hub, a depending sleeve formed integrally with said flange and being offset from said axis, and a bore extending through said flange and said sleeve.

2. The spinner head of claim 1, wherein said upper head has a plurality of said integral spacer sleeves, said cap having bores indexed to said spacer sleeves and a plurality of fasteners passing through said bores in said cap and said spacer sleeves and securing said cap to said upper head.

3. The spinner head of claim 1, wherein said at least one spacer sleeve is electrically insulative.

4. The spinner head of claim 1, wherein said sleeve depending from said hub of the upper head, said sleeve depending from said flange of the lower head and said at least one spacer sleeve of said upper head are electrically insulative, and are offset from one another about said axis.

5. The spinner head of claim 2 further comprising:

two electrical terminals operatively coupled to said heater;

a first conductive slip ring disposed between said upper head and said lower head, said first slip ring having first and second bores therethrough, said first bore of said slip ring receiving said sleeve depending from said hub of said upper head;

a second conductive slip ring disposed adjacent said lower head, said second slip ring having third and fourth bores therethrough, said third bore receiving said sleeve depending from the flange of said lower head;

a conductive fastener passing through said bore in said sleeve depending from said lower head, passing through and contacting said second bore in said first slip ring, through said bore in said hub of said upper head, and making contact with said first electrical terminal; and a second conductive fastener passing through and contacting said fourth bore in said second slip ring, through said bore in said flange of said lower head, through said bore in said sleeve depending from said hub of said upper head, and making contact with said second electrical terminal.

6. The spinner head of claim 1 wherein said cap and said upper head are formed from a rigid material having a density less than aluminum.

7. The spinner head of claim 6 wherein said rigid material is a polymer.

8. The spinner head of claim 7 wherein said polymer is a polycarbonate derivative.

9. The spinner head of claim 1 wherein said cap, said upper head and said lower head are formed from a rigid material having a density less than aluminum.

10. The spinner head of claim 9 wherein said rigid material is a polymer.

11. The spinner head of claim 10 wherein said polymer is a polycarbonate derivative.

12. A spinner head for use in a cotton candy machine having an axis of rotation for said head and comprising:

a cap;

an upper head member including an integral disk having an upper surface with at least one spacer sleeve formed integrally with said disk extending upwardly from said upper surface and having a bore therethrough and a downwardly integral hub depending from said disk about said axis and wherein said upper head further includes a depending hub about said axis having a bore therethrough, a sleeve depending from said hub formed integrally therewith and being offset from said axis and a bore extending through said hub and sleeve;

a heater having two terminals;

a lower head member separate from said upper head member;

said heater disposed between said cap and said upper head member and said lower head member disposed beneath said upper head member:

two electrically conducting slip rings disposed about said hub and said lower member, respectively;

at least one elongated fastener for securing said cap to said upper head through said spacer sleeve;

at least two elongated conductors, each for conducting electricity respectively between a heater terminal and a slip ring each of said conductors passing through said hub and said lower head; and said upper and lower head each being made of non-electrically conducting material and electrically isolating said slip rings from each other and said elongated conductors from each other, each respective conductor being electrically connected to one of said slip rings.

13. A spinner head as in claim 12 further including an integral electrical insulating sleeve extending from said lower head member for electrically insulating one of said elongated conductors from one of said slip rings.

14. A spinner head as in claim 13 further including at least one integral electrical insulating sleeve extending from said upper head for electrically insulating one of said elongated fasteners.

* * * * *